United States Patent
Shi et al.

(10) Patent No.: US 10,168,777 B2
(45) Date of Patent: Jan. 1, 2019

(54) DISPLAY CONTROL METHOD AND TERMINAL DEVICE

(71) Applicant: Huawei Technologies Co., Ltd., Shenzhen (CN)

(72) Inventors: Jieke Shi, Shanghai (CN); Lin Yu, Shanghai (CN); Chien-Nan Lin, Taipei (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

(21) Appl. No.: 15/465,876

(22) Filed: Mar. 22, 2017

(65) Prior Publication Data

US 2017/0277261 A1    Sep. 28, 2017

(30) Foreign Application Priority Data

Mar. 22, 2016  (CN) .......................... 2016 1 0164504

(51) Int. Cl.
  *G06F 3/01*    (2006.01)
  *G06F 3/0481*  (2013.01)
  (Continued)

(52) U.S. Cl.
  CPC ........ *G06F 3/014* (2013.01); *G02F 1/133528* (2013.01); *G04G 9/0005* (2013.01);
  (Continued)

(58) Field of Classification Search
  CPC ........ G06F 3/014; G06F 3/0481; G06F 3/041; G06F 3/0488; G06F 3/044; G04G 9/0064;
  (Continued)

(56) References Cited

U.S. PATENT DOCUMENTS

| 6,600,527 B1 | 7/2003 | Basturk et al. |
| 2002/0021622 A1 | 2/2002 | Baroche |

(Continued)

FOREIGN PATENT DOCUMENTS

| CN | 101674372 A | 3/2010 |
| CN | 103309428 A | 9/2013 |

(Continued)

OTHER PUBLICATIONS

Machine Translation and Abstract of Chinese Publication No. CN103309428, Sep. 18, 2013, 10 pages.

(Continued)

*Primary Examiner* — Md Saiful A Siddiqui
(74) *Attorney, Agent, or Firm* — Conley Rose, P.C.

(57) ABSTRACT

A display control method and a terminal device are provided. The display control method is applied to a terminal device having a transmissive liquid crystal display (LCD), and a backlight side of the transmissive LCD has a mechanical structure. The method includes detecting an operating status of the terminal device, turning off the transmissive LCD of the terminal device when the terminal device is in a standby state, and controlling the transmissive LCD to be in a transparent state to display the mechanical structure on the backlight side of the transmissive LCD. Hence, the method reduces power consumption of the terminal device and retains a watch function of displaying time by the terminal device.

20 Claims, 8 Drawing Sheets

(51) Int. Cl.
  *G02F 1/1335* (2006.01)
  *G04G 9/00* (2006.01)
  *G04G 21/02* (2010.01)

(52) U.S. Cl.
  CPC ......... *G04G 9/0064* (2013.01); *G04G 21/025* (2013.01); *G06F 3/0481* (2013.01); *G02F 2203/01* (2013.01)

(58) Field of Classification Search
  CPC ................ G04G 9/0005; G04G 21/025; G02F 1/133528; G02F 2203/01; G02F 1/1335
  See application file for complete search history.

(56) References Cited

U.S. PATENT DOCUMENTS

| | | | |
|---|---|---|---|
| 2015/0177841 A1 | 6/2015 | VanBlon et al. | |
| 2015/0301506 A1 | 10/2015 | Koumaiha | |
| 2016/0103985 A1* | 4/2016 | Shim | G06F 3/0346 726/19 |
| 2016/0109861 A1* | 4/2016 | Kim | G04G 21/08 368/69 |
| 2016/0306328 A1* | 10/2016 | Ko | G04C 17/00 |
| 2016/0357386 A1* | 12/2016 | Choi | G04G 9/0064 |
| 2017/0102855 A1* | 4/2017 | Kwon | G06F 3/04817 |

FOREIGN PATENT DOCUMENTS

| | | |
|---|---|---|
| CN | 103399483 A | 11/2013 |
| CN | 203882101 U | 10/2014 |
| CN | 104683581 A | 6/2015 |
| CN | 104731315 A | 6/2015 |
| CN | 105093909 A | 11/2015 |
| GB | 2291723 A | 1/1996 |

OTHER PUBLICATIONS

Machine Translation and Abstract of Chinese Publication No. CN103399483, Nov. 20, 2013, 12 pages.
Machine Translation and Abstract of Chinese Publication No. CN104683581, Jun. 3, 2015, 9 pages.
Machine Translation and Abstract of Chinese Publication No. CN105093909, Nov. 25, 2015, 9 pages.
Machine Translation and Abstract of Chinese Publication No. CN203882101, Oct. 15, 2014, 6 pages.
Foreign Communication From a Counterpart Application, Chinese Application No. 201610164504.6, Chinese Office Action dated Sep. 19, 2017, 6 pages.
Foreign Communication From a Counterpart Application, European Application No. 17162228.5, Extended European Search Report dated Jul. 6, 2017, 7 pages.
Machine Translation and Abstract of Chinese Publication No. CN101674372, Mar. 17, 2010, 15 pages.
Foreign Communication From a Counterpart Application, Chinese Application No. 201610164504.6, Chinese Office Action dated Mar. 8, 2018, 8 pages.

\* cited by examiner

DISPLAY CONTROL METHOD AND TERMINAL DEVICE

CROSS-REFERENCE TO RELATED APPLICATIONS

This application claims priority to Chinese Patent Application No. 201610164504.6 filed on Mar. 22, 2016, which is hereby incorporated by reference in its entirety.

TECHNICAL FIELD

The present disclosure relates to the field of intelligent terminal technologies, and in particular, to a display control method and a terminal device.

BACKGROUND

A smart watch is a new-type terminal device. An intelligent system is embedded in a smart watch such that an up-to-date information technology (IT) is combined with conventional watch functions. The smart watch may display caller identification information, news and a weather report by connecting to the Internet by means of a user terminal (such as a smartphone) or a home network, and further, calls, short message service (SMS) messages, electronic mails (e-mails), photos, music, and the like on the user terminal may be synchronized into the smart watch. Smart watches have characteristics such as portability, easy use, and abundant functions, and are well adored by users.

A display of a smart watch is a key component. At present, displays of most smart watches are active matrix/organic light emitting diode (AMOLED) displays. An AMOLED display of the smart watch needs to be woken up every minute to update time when a smart watch is in a standby state. Consequently, power consumption of the smart watch is increased to some degree, and standby time of the smart watch is reduced. In addition, if battery power of a smart watch is thoroughly consumed, an AMOLED display of the smart watch cannot display time. Consequently, a watch function of displaying time by the smart watch is disabled.

SUMMARY

Embodiments of the present disclosure provide a display control method and a terminal device in order to reduce power consumption of the terminal device and retain a watch function of displaying time by the terminal device.

A first aspect of the embodiments of the present disclosure discloses a display control method, applied to a terminal device having a transmissive liquid crystal display (LCD), where a backlight side of the transmissive LCD has a mechanical structure, and the method includes detecting an operating status of the terminal device, turning off the transmissive LCD of the terminal device if the terminal device is in a standby state, and controlling the transmissive LCD to be in a transparent state to display the mechanical structure on the backlight side of the transmissive LCD.

A transmissive LCD of a terminal device may be directly turned off and the transmissive LCD of the terminal device does not need to be woken up in order to reduce power consumption of the terminal device when the terminal device is in a standby state. In addition, even if battery power of the terminal device is thoroughly consumed, the transmissive LCD of the terminal device is in a transparent state such that a mechanical structure on a backlight side of the transmissive LCD can be displayed. In this way, a watch function of displaying time by the terminal device can be retained.

With reference to the first aspect, in a first possible implementation manner of the first aspect, the method further includes determining a priority attribute of a notification message if the notification message is received, and keeping the transmissive LCD in the transparent state if the priority attribute indicates a low priority.

A user may preset the priority attribute of the notification message, and the priority attribute may be classified into a low priority or a high priority. A low-priority notification message may not need to be notified to the user immediately. This helps save power and reduce power consumption of the terminal device.

With reference to the first possible implementation manner of the first aspect, in a second possible implementation manner of the first aspect, the method further includes receiving a screen-on instruction entered for the transmissive LCD, responding to the screen-on instruction and turning on the transmissive LCD such that the transmissive LCD is in a screen-on state, and controlling a polarizer in the transmissive LCD to shield the mechanical structure, and displaying the notification message on the transmissive LCD.

The user may operate a panel of the transmissive LCD to trigger entering the screen-on instruction, or the user may operate a mechanical key on the terminal device to trigger entering the screen-on instruction.

With reference to the second possible implementation manner of the first aspect, in a third possible implementation manner of the first aspect, after receiving a screen-on instruction entered for the transmissive LCD, the method further includes obtaining a moving track of the terminal device within a preset time, determining whether the moving track of the terminal device is consistent with a prestored moving track of the terminal device, and performing the step of responding to the screen-on instruction and turning on the transmissive LCD such that the transmissive LCD is in a screen-on state if the moving track of the terminal device is consistent with the prestored moving track of the terminal device.

The prestored moving track of the terminal device may be a pre-learned moving track of the terminal device. When the terminal device determines that the moving track of the terminal device is consistent with the prestored moving track of the terminal device, it indicates that current entering of the screen-on instruction is really triggered by a user actively rather than an accidental touch, and the terminal device may turn on the transmissive LCD. This helps improve user experience.

With reference to the first possible implementation manner of the first aspect, in a fourth possible implementation manner of the first aspect, the method further includes turning on the transmissive LCD such that the transmissive LCD is in a screen-on state if the priority attribute indicates a high priority, controlling a polarizer in the transmissive LCD to shield the mechanical structure, and displaying the notification message on the transmissive LCD.

A high-priority notification message is a message that needs to be notified to the user immediately. Therefore, the terminal device needs to immediately turn on the transmissive LCD and display the notification message. This helps improve user experience.

With reference to the fourth possible implementation manner of the first aspect, in a fifth possible implementation manner of the first aspect, the terminal device is a wearable device, and after it is determined that the priority attribute of the notification message is the high priority, the method further includes detecting a heart rate of a user wearing the wearable device, determining whether the heart rate is less than a preset heart rate threshold, and performing the step of turning on the transmissive LCD such that the transmissive LCD is in a screen-on state if the heart rate is not less than the preset heart rate threshold.

When the priority attribute of the notification message received by the terminal device is the high priority, the user may be currently in two states, a sleeping state and a non-sleeping state. The user is in the non-sleeping state, and the terminal device may turn on the transmissive LCD if the terminal device determines that the heart rate of the user wearing the wearable device is greater than the preset heart rate threshold. The user is in the sleeping state, and the terminal device does not need to turn on the transmissive LCD if the terminal device determines that the heart rate of the user wearing the wearable device is less than the preset heart rate threshold. This helps save power, reduce power consumption of the terminal device, and improve user experience.

With reference to any one of the first aspect to the fifth possible implementation manner of the first aspect, in a sixth possible implementation manner of the first aspect, the method further includes detecting whether screen-on duration of the transmissive LCD without operation reaches a preset time threshold, turning off the transmissive LCD if the screen-on duration of the transmissive LCD without operation reaches the preset time threshold, and controlling the transmissive LCD to be in the transparent state to display the mechanical structure.

The transmissive LCD is turned off when it is detected that the screen-on duration of the transmissive LCD without operation reaches the preset time threshold. This helps save power and reduce power consumption of the terminal device.

With reference to any one of the first aspect to the fifth possible implementation manner of the first aspect, in a seventh possible implementation manner of the first aspect, the method further includes receiving a screen-off instruction entered for the transmissive LCD, responding to the screen-off instruction, turning off the transmissive LCD, and controlling the transmissive LCD to be in the transparent state to display the mechanical structure.

The user may operate the terminal device at any time. For example, the user may press a power key of the terminal device to trigger entering the screen-off instruction, or the user may press the transmissive LCD for duration greater than preset duration, to trigger entering the screen-off instruction.

A second aspect of the embodiments of the present disclosure discloses a terminal device. The terminal device includes functional units that are configured to perform a part or all of steps of any method according to the first aspect of the embodiments of the present disclosure. Power consumption of the terminal device can be reduced and a watch function of displaying time by the terminal device can also be retained when the terminal device performs a part or all of steps of any method in the first aspect.

A third aspect of the embodiments of the present disclosure discloses a terminal device. The terminal device includes a processor, a transmissive LCD, a mechanical structure, and a memory. The memory is configured to store an instruction, and the processor is configured to execute the instruction. The processor executes the instruction to perform a part or all of steps of any method according to the first aspect of the embodiments of the present disclosure. Power consumption of the terminal device can be reduced and a watch function of displaying time by the terminal device can also be retained when the terminal device performs a part or all of steps of any method in the first aspect.

A fourth aspect of the embodiments of the present disclosure discloses a computer storage medium. The computer storage medium stores a program, and the program includes an instruction used to perform a part or all of steps of any method according to the first aspect of the embodiments of the present disclosure.

In the embodiments of the present disclosure, the terminal device includes a transmissive LCD and a mechanical structure located on a backlight side of the transmissive LCD. The terminal device may detect an operating status of the terminal device in real time. The terminal device may turn off the transmissive LCD of the terminal device, and control the transmissive LCD to be in a transparent state to display the mechanical structure on the backlight side of the transmissive LCD if the terminal device is in a standby state. As can be seen, by means of the embodiments of the present disclosure, when the terminal device is in the standby state, the transmissive LCD of the terminal device may be directly turned off and the transmissive LCD of the terminal device does not need to be woken up in order to reduce power consumption of the terminal device. In addition, even if battery power of the terminal device is thoroughly consumed, the transmissive LCD of the terminal device is in the transparent state such that the mechanical structure on the backlight side of the transmissive LCD can be displayed. In this way, a watch function of displaying time by the terminal device can be retained.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first," "second," and so on are intended to distinguish between different objects but do not indicate a particular order. In addition, the terms "including," "having," and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Embodiments of the present disclosure disclose a display control method and a terminal device in order to reduce power consumption of the terminal device and retain a watch function of displaying time by the terminal device. Details are separately described below.

Figure 1A:
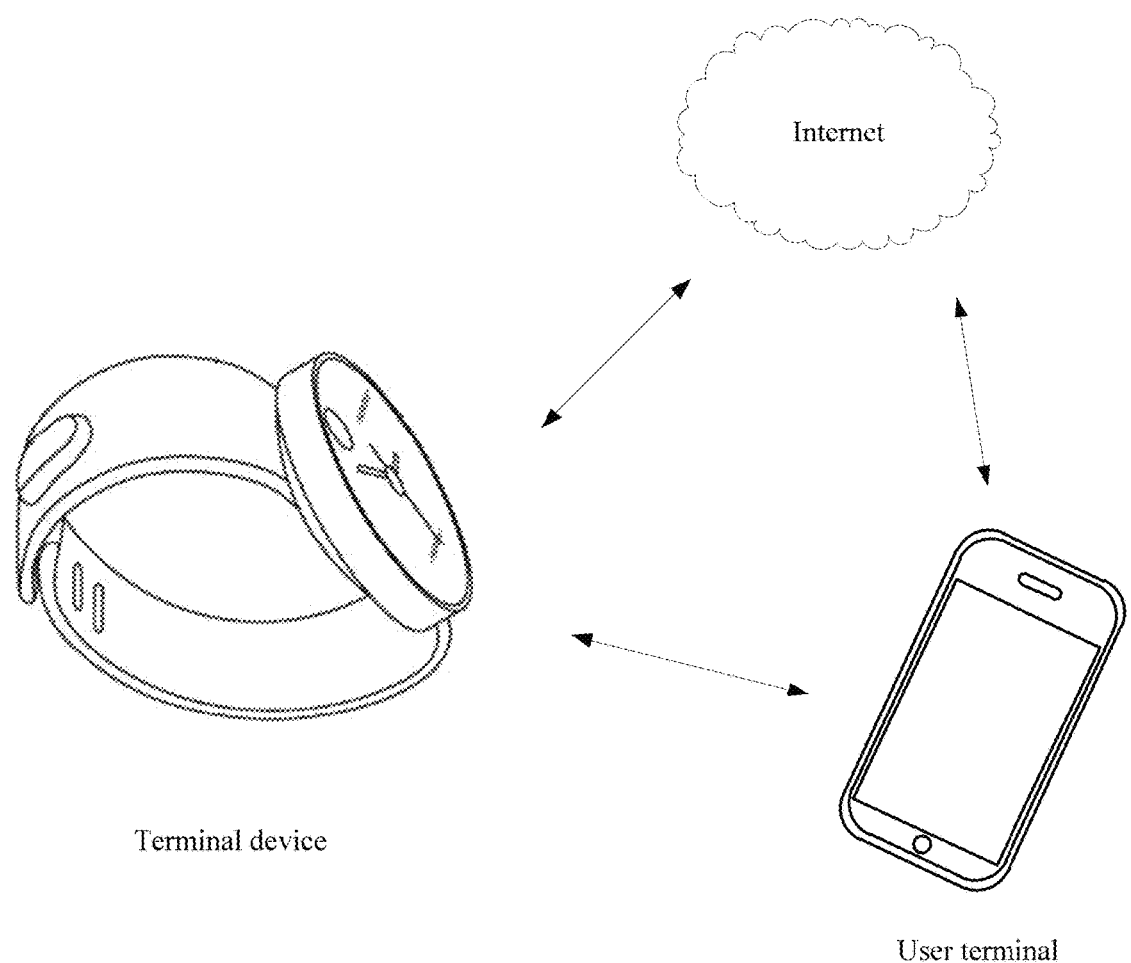
FIG. 1A is a schematic diagram of a network architecture according to an embodiment of the present disclosure.

To better understand the display control method disclosed in the embodiments of the present disclosure, a network architecture to which the embodiments of the present disclosure are applicable is first described below. Referring to FIG. 1A, FIG. 1A is a schematic diagram of a network architecture according to an embodiment of the present disclosure. As shown in FIG. 1A, the network architecture includes a terminal device and a user terminal.

The terminal device may be a terminal having a human-computer interaction interface (UI) and a watch function, for example, a smart watch. The terminal device may include a transmissive LCD and a mechanical structure. The transmissive LCD is in a transparent state when turned off, and may display the mechanical structure on a backlight side of the transmissive LCD. The mechanical structure may include a mechanical watch face, or may include a built-in mechanical component. The mechanical structure may clearly display time in strong light when the transmissive LCD is in the transparent state, and backlight of the transmissive LCD may be used to complement brightness in dark such that time is displayed. In addition, high-definition UI may be presented on the transmissive LCD when a user turns on the transmissive LCD.

The user terminal may include but is not limited to a smartphone, a notebook computer, a personal computer (PC), a personal digital assistant (PDA), a mobile Internet device (MID), a smart wearable device (such as a smart watch or a smart band), and other various user terminals.

In the network architecture shown in FIG. 1A, an intelligent system is embedded in the terminal device such that an up-to-date IT is combined with conventional watch functions. The terminal device (such as a smart watch) may display caller identification information, news, and a weather report by connecting to the Internet by means of a user terminal (such as a smartphone) or a home network, and further, calls, SMS messages, e-mails, photos, music, and the like in the user terminal may be synchronized into the terminal device.

Figure 1B:
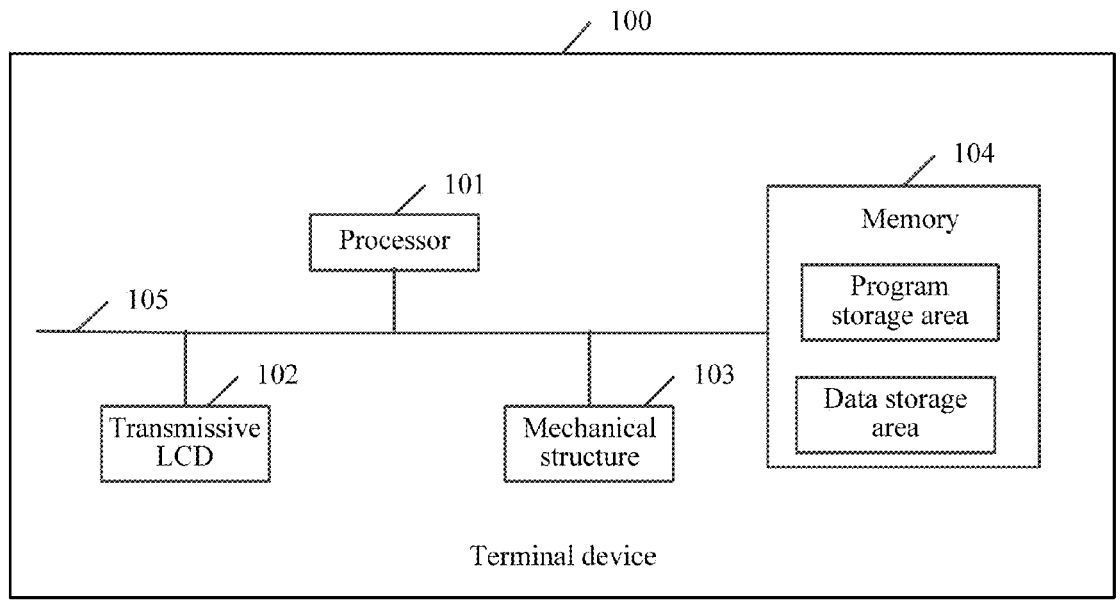
FIG. 1B is a composition block diagram of a simplified structure of a terminal device according to an embodiment of the present disclosure.

Referring to FIG. 1B, FIG. 1B is a composition block diagram of a simplified structure of a terminal device 100 according to an embodiment of the present disclosure. As shown in FIG. 1B, the terminal device 100 includes a processor 101, a transmissive LCD 102, a mechanical structure 103, and a memory 104. These components communicate with each other by means of one or more communications buses 105. A person skilled in the art may understand that the structure of the terminal device 100 in FIG. 1B does not constitute a limitation to the present disclosure. The terminal device 100 may be in a bus structure, or may also be in a star structure, or may further include more or less components than the components shown in FIG. 1B. For example, the terminal device 100 may further include a chip of a watch (system-on-a-chip (SoC)), a sensor, BLUETOOTH (BT), WI-FI, a display control circuit, or the like, or may include a combination of some components, or may include a different component arrangement.

The processor 101 is a control center of the terminal device 100, connects each part of the whole terminal device 100 by means of various interfaces and lines, and performs various functions of the terminal device 100 and/or processes data by executing or operating program code and/or a module stored in the memory 104 and invoking data stored in the memory 104. The processor 101 may include an integrated circuit (IC), for example, may include a single packaged IC, or may include multiple successive packaged ICs that have same functions or different functions. For example, the processor 101 may include only a central processing unit (CPU), or may be a combination of a CPU, a digital signal processor (DSP), a graphic processing processor (GPU), and a control chip (such as a baseband chip) in a communications unit. In an implementation manner of the present disclosure, the CPU may be of a single computing core, or may include multiple computing cores.

The transmissive LCD 102 is a flat and thin LCD. The transmissive LCD 102 includes two polarizers, two electrodes, and one layer of liquid crystal. A backlight source may directly penetrate the two polarizers when no voltage is applied to the two electrodes of the transmissive LCD 102, and then the mechanical structure 103 on a backlight side of the transmissive LCD 102 is seen. Meanwhile, the mechanical structure 103 is not affected by the transmissive LCD 102. Molecules in the liquid crystal layer may rotate in a direction the same as that of an electric field, to stop a light source from passing through a second polarizer when a voltage is applied to the transmissive LCD 102, and the second polarizer can shield the mechanical structure 103. In this case, the transmissive LCD 102 is in a screen-on state, can display a high-definition UI, and meanwhile, is not affected by the mechanical structure 103.

The transmissive LCD 102 may be used as an input apparatus, and is configured to implement interaction between a user and the terminal device 100 and/or enter information to the terminal device 100. For example, the transmissive LCD 102 may receive number or character information entered by the user, to generate signal input related to user settings or function control. Further, the transmissive LCD 102 may receive an operation of the user on a panel of the transmissive LCD 102 or on a position close to a panel of the transmissive LCD 102 using any proper object or attachment such as a finger or a stylus, and drive a corresponding connection apparatus according to a preset program. In addition, the panel of the transmissive LCD 102 may be a resistive touch panel, a capacitive touch panel, an infrared touch panel, a surface acoustic wave touch panel, or another type of touch panel. In another implementation manner of the present disclosure, a physical input key of the terminal device 100 may also be used as the input apparatus to implement interaction between the user and the terminal device and/or enter information to the terminal device 100. The physical input key is, for example, one or more of a functional key (such as a volume control key or a switch key), a trackball, a joystick, or the like.

The memory 104 may be configured to store the program code and the module, and processor 101 runs the program code and the module stored in the memory 104, to perform various functions of the terminal and process data. The memory 104 mainly includes a program storage area and a data storage area. The program storage area may store an operating system and program code required by at least one function, for example, program code used to identify a cell that is not connected to a communications network. The data storage area may store data (such as audio data and a phone book) created according to use of the terminal and the like. In a specific implementation manner of the present disclosure, the memory 104 may include a volatile memory, such as a nonvolatile random access memory (NVRAM), a phase change random access memory (PRAM), or a magnetoresistive random access memory (MRAM), and may further include a nonvolatile memory, such as at least one magnetic storage device, an electrically erasable programmable read-only memory (EEPROM), or a flash memory, for example, a NOR flash memory or a NAND flash memory. The nonvolatile memory stores the operating system and the program code executed by a processor unit. The processor unit loads an operating program and data from the nonvolatile memory to a memory and stores digital content in a massive storage apparatus. The operating system includes various components and/or drivers that are used for control and management of conventional system tasks, such as memory management, storage device control, and management of the power supply, and that facilitate communication between various types of software and hardware. In this implementation manner of the present disclosure, the operating system may be the ANDROID operating system of the GOOGLE Inc., the iOS operating system developed by the APPLE Inc., or the WINDOWS operating system developed by the MICROSOFT Corporation, or an embedded operating system such as VXWORKS.

The program code may include program code of any application installed on the terminal device 100, including but not limited to program code of applications such as explorers, e-mails, instant messaging service, text processing, virtual keyboard, widget, encryption, digital rights management, speech recognition, voice duplication, positioning (for example, a function provided by a global positioning system), and music play.

In the terminal device 100 shown in FIG. 1B, the processor 101 may invoke the program code stored in the memory 104, to perform the following operations detecting an operating status of the terminal device 100, turning off the transmissive LCD 102 of the terminal device 100 if the terminal device 100 is in a standby state, and controlling the transmissive LCD 102 to be in a transparent state to display the mechanical structure 103 on the backlight side of the transmissive LCD 102.

When the terminal device 100 is in the standby state, the transmissive LCD 102 of the terminal device 100 may be directly turned off and the transmissive LCD 102 of the terminal device 100 does not need to be woken up in order to reduce power consumption of the terminal device 100. In addition, even if battery power of the terminal device 100 is thoroughly consumed, the transmissive LCD 102 of the terminal device 100 is in the transparent state such that the mechanical structure 103 on the backlight side of the transmissive LCD 102 can be displayed. In this way, a watch function of displaying time by the terminal device 100 can be retained.

Optionally, the processor 101 may further invoke the program code stored in the memory 104, to perform the operations of determining a priority attribute of a notification message if the notification message is received, and keeping the transmissive LCD 102 in the transparent state if the priority attribute indicates a low priority.

The user may preset the priority attribute of the notification message, and the priority attribute may be classified into a low priority or a high priority. For example, a low-priority notification message may be a calendar, weather, news, or information/an event defined by the user and that does not need to be notified, and a high-priority notification message may be information such as a SMS message, an e-mail, or a WECHAT message, or may be information defined by the user and that needs to be notified, for example, flight information, a meeting reminder, or achievement of an exercise target.

The low-priority notification message may not need to be notified to the user immediately. In this case, the transmissive LCD 102 may be in the transparent state, and does not display the notification message. After the user turns on the transmissive LCD 102, the transmissive LCD 102 displays the notification message when the user actively views the low-priority notification message. This helps save power and reduces power consumption of the terminal device 100.

Optionally, the processor 101 may further invoke the program code stored in the memory 104, to perform the operations of receiving a screen-on instruction entered for the transmissive LCD 102, responding to the screen-on instruction and turning on the transmissive LCD 102 such that the transmissive LCD 102 is in a screen-on state, and controlling a polarizer in the transmissive LCD 102 to shield the mechanical structure 103, and displaying the notification message on the transmissive LCD 102.

The user may operate a panel of the transmissive LCD 102 to trigger entering the screen-on instruction, or the user may operate a mechanical key on the terminal device 100 to trigger entering the screen-on instruction. After the user enters the screen-on instruction, the terminal device 100 may turn on the transmissive LCD 102. In this case, the transmissive LCD 102 is in the screen-on state, and meanwhile, the terminal device 100 may control the polarizer in the transmissive LCD 102 to shield the mechanical structure 103 and display the notification message on the transmissive LCD 102.

Optionally, after the receiving a screen-on instruction entered for the transmissive LCD 102, the processor 101 may further invoke the program code stored in the memory 104, to perform the operations of obtaining a moving track of the terminal device 100 within a preset time, determining whether the moving track of the terminal device 100 is consistent with a prestored moving track of the terminal device 100, and performing the step of responding to the screen-on instruction and turning on the transmissive LCD 102 such that the transmissive LCD 102 is in a screen-on state if the moving track of the terminal device 100 is consistent with the prestored moving track of the terminal device 100.

The prestored moving track of the terminal device 100 may be a pre-learned moving track of the terminal device 100. When the terminal device 100 determines that the moving track of the terminal device 100 is consistent with the prestored moving track of the terminal device 100, it indicates that current entering of the screen-on instruction is really triggered by the user actively rather than an accidental touch, and the terminal device 100 may turn on the transmissive LCD 102. This helps improve user experience.

Optionally, the processor 101 may further invoke the program code stored in the memory 104, to perform the operations of turning on the transmissive LCD 102 such that the transmissive LCD 102 is in the screen-on state if the priority attribute indicates a high priority, and controlling the polarizer in the transmissive LCD 102 to shield the mechanical structure 103, and displaying the notification message on the transmissive LCD 102.

A high-priority notification message needs to be notified to the user immediately. Therefore, the terminal device 100 needs to immediately turn on the transmissive LCD 102 and display the notification message. This helps improve user experience.

Optionally, the terminal device 100 is a wearable device, and after the processor 101 determines that the priority attribute of the notification message is the high priority, the processor 101 may further invoke the program code stored in the memory 104, to perform the operations of detecting a heart rate of a user wearing the wearable device, determining whether the heart rate is less than a preset heart rate threshold, and performing the step of turning on the transmissive LCD 102 such that the transmissive LCD 102 is in a screen-on state if the heart rate is not less than the preset heart rate threshold.

When the priority attribute of the notification message received by the terminal device 100 is the high priority, the user may be currently in two states, a sleeping state and a non-sleeping state. The user is in the non-sleeping state if the terminal device 100 determines that the heart rate of the user wearing the wearable device is greater than the preset heart rate threshold, and the terminal device 100 may turn on the transmissive LCD 102. The user is in the sleeping state if the terminal device 100 determines that the heart rate of the user wearing the wearable device is less than the preset heart rate threshold, and the terminal device 100 does not need to turn on the transmissive LCD 102. This helps save power, reduce power consumption of the terminal device 100, and improve user experience.

Optionally, the processor 101 may further invoke the program code stored in the memory 104, to perform the operations of detecting whether screen-on duration of the transmissive LCD 102 without operation reaches a preset time threshold, turning off the transmissive LCD 102 if the screen-on duration of the transmissive LCD 102 without operation reaches the preset time threshold, and controlling the transmissive LCD 102 to be in the transparent state to display the mechanical structure 103.

The transmissive LCD 102 is turned off when it is detected that the screen-on duration of the transmissive LCD 102 without operation reaches the preset time threshold. This helps save power and reduces power consumption of the terminal device 100.

Optionally, the processor 101 may further invoke the program code stored in the memory 104, to perform the operations of receiving a screen-off instruction entered for the transmissive LCD 102, responding to the screen-off instruction, and turning off the transmissive LCD 102, and controlling the transmissive LCD 102 to be in the transparent state to display the mechanical structure 103.

The user may operate the terminal device 100 at any time. For example, the user may press a power key of the terminal device 100 to trigger entering the screen-off instruction, or the user may press the transmissive LCD 102 for duration greater than preset duration, to trigger entering the screen-off instruction.

In the terminal device 100 described in FIG. 1B, when the terminal device 100 is in a standby state, a transmissive LCD 102 of the terminal device 100 may be directly turned off and the transmissive LCD 102 of the terminal device 100 does not need to be woken up in order to reduce power consumption of the terminal device 100. In addition, even if battery power of the terminal device 100 is thoroughly consumed, the transmissive LCD 102 of the terminal device 100 is in a transparent state such that a mechanical structure on a backlight side of the transmissive LCD 100 can be displayed. In this way, a watch function of displaying time by the terminal device 100 can be retained.

Figure 2A:
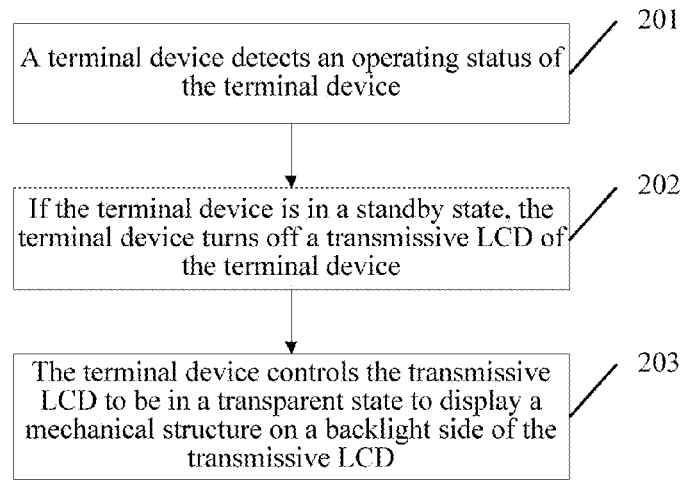
FIG. 2A is a schematic flowchart of a display control method according to an embodiment of the present disclosure.

Based on the terminal device 100 described in FIG. 1B, an embodiment of the present disclosure discloses a display control method. Referring to FIG. 2A, FIG. 2A is a schematic flowchart of a display control method according to an embodiment of the present disclosure. As shown in FIG. 2A, the method may include the following steps.

Step 201: A terminal device detects an operating status of the terminal device.

In this embodiment of the present disclosure, the operating status of the terminal device may be mainly divided into two types, a standby state and a non-standby state. The standby state may be understood as a state when the terminal device is turned on but does not perform any substantive operation (that is, does not perform any operation on files or programs). In the standby state, the system only needs to remain a low-power-consumption connection to the terminal device, for example, BT connection. The non-standby state may be understood as a state in which the terminal device is turned on and performs a substantive operation, for example, runs an embedded-in application (such as a map, notification information, health management, or a call.).

Step 202: If the terminal device is in a standby state, the terminal device turns off a transmissive LCD of the terminal device.

In this embodiment of the present disclosure, if the terminal device is in the standby state, the terminal device may turn off the transmissive LCD of the terminal device such that the transmissive LCD is powered off completely (that is, no voltage is applied to two electrodes in the transmissive LCD). The system only needs to remain a low-power-consumption connection to the terminal device, for example, BT connection. In this way, when the terminal device is in the standby state, the terminal device is in a most power saving state. When the transmissive LCD is powered off completely, 2-3 milliamperes (mA) can be saved, and when a system is in a complete standby state, 0.3-1 mA can be saved.

Step 203: The terminal device controls the transmissive LCD to be in a transparent state to display a mechanical structure on a backlight side of the transmissive LCD.

In this embodiment of the present disclosure, when a terminal device is in a standby state, after turning off a transmissive LCD of the terminal device, the terminal device may further control the transmissive LCD to be in a transparent state. In this case, a mechanical structure on a backlight side of the transmissive LCD can be displayed, and a user can see time displayed by the mechanical structure. The mechanical structure may clearly display time in strong light when the transmissive LCD is in the transparent state, and backlight of the transmissive LCD may be used to complement brightness in dark such that time is displayed. In addition, even if battery power of the terminal device is thoroughly consumed, the mechanical structure can still display time.

Figure 2B:
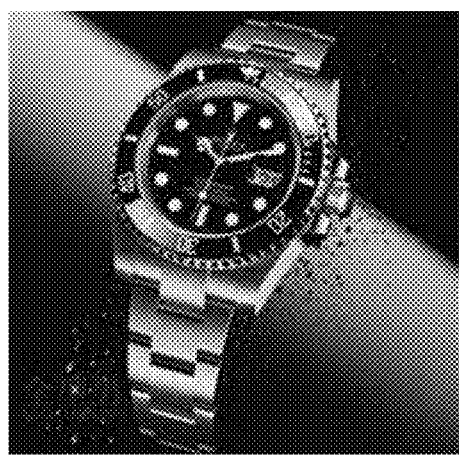
FIG. 2B is a display effect diagram of a terminal device according to an embodiment of the present disclosure.

Referring to FIG. 2B, FIG. 2B is a display effect diagram of a terminal device according to an embodiment of the present disclosure. The terminal device shown in FIG. 2B is in a standby state. As can be seen from FIG. 2B, a transmissive LCD is in a transparent state when the terminal device is in the standby state. In this case, a user sees a mechanical watch face on a backlight side of the transmissive LCD, and clearly sees current time on the mechanical watch face.

In the process of the method described in FIG. 2A, a terminal device may detect an operating status of the terminal device in real time. If the terminal device is in a standby state, the terminal device may turn off a transmissive LCD of the terminal device, and control the transmissive LCD to be in a transparent state to display a mechanical structure on a backlight side of the transmissive LCD. As can be seen, by means of this embodiment of the present disclosure, when the terminal device is in the standby state, the transmissive LCD of the terminal device may be directly turned off and the transmissive LCD of the terminal device does not need to be woken up in order to reduce power consumption of the terminal device. In addition, even if battery power of the terminal device is thoroughly consumed, the transmissive LCD of the terminal device is in the transparent state such that the mechanical structure on the backlight side of the transmissive LCD can be displayed. In this way, a watch function of displaying time by the terminal device can be retained.

Figure 3A:
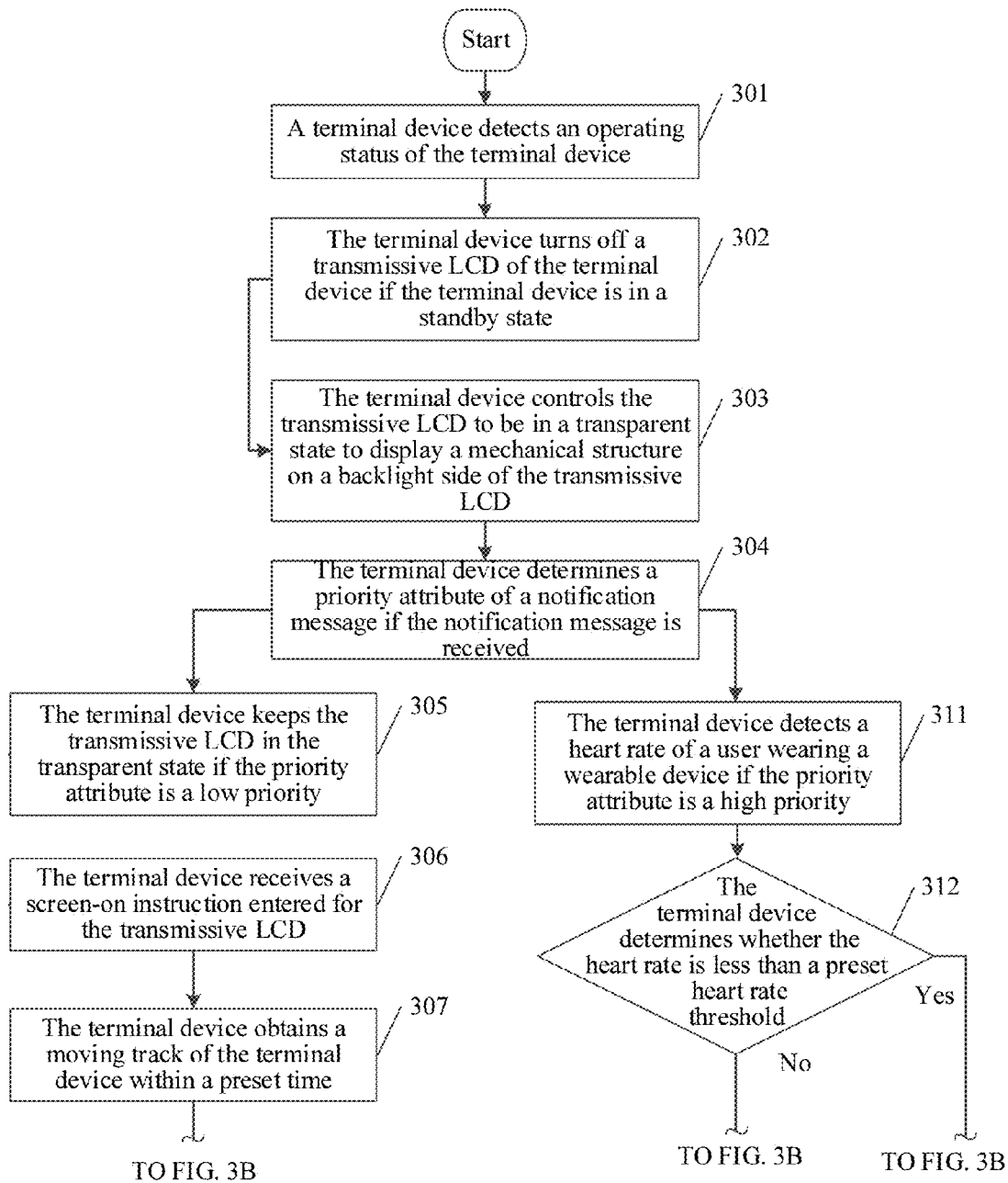
FIG. 3A and FIG. 3B are a schematic flowchart of another display control method according to an embodiment of the present disclosure.
Figure 3B:
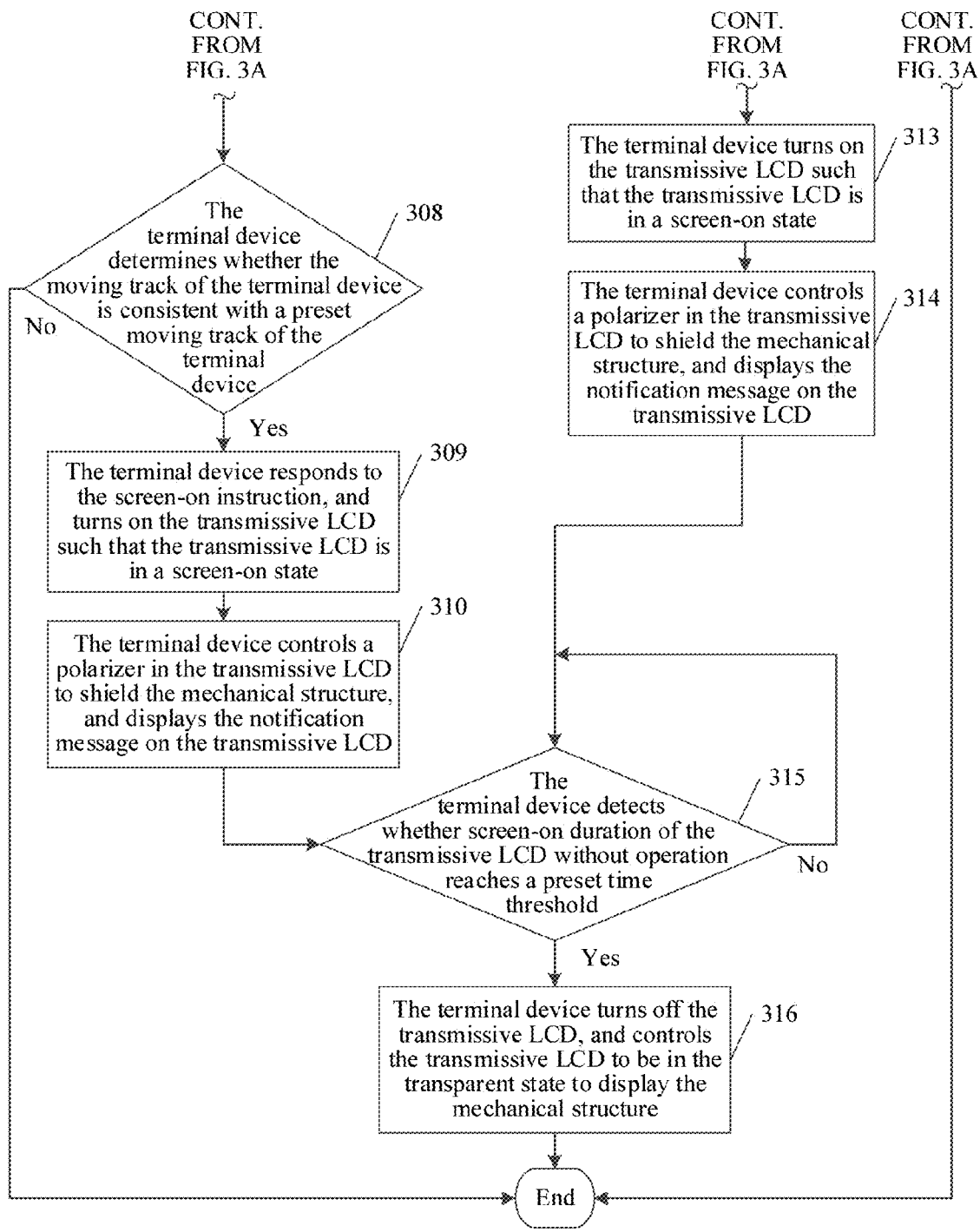

Based on the network architecture described in FIG. 1A and the terminal device described in FIG. 1B, an embodiment of the present disclosure discloses a display control method. Referring to FIG. 3A and FIG. 3B, FIG. 3A and FIG. 3B are a schematic flowchart of another display control method according to an embodiment of the present disclosure. As shown in FIG. 3A and FIG. 3B, the method may include the following steps.

Step 301: A terminal device detects an operating status of the terminal device.

Step 302: The terminal device turns off a transmissive LCD of the terminal device if the terminal device is in a standby state.

Step 303: The terminal device controls the transmissive LCD to be in a transparent state to display a mechanical structure on a backlight side of the transmissive LCD.

Step 304: The terminal device determines a priority attribute of a notification message if the notification message is received.

In this embodiment of the present disclosure, the terminal device may receive a notification message pushed by a server in the Internet, where the notification message is, for example, a calendar, weather, news, or the like, and may further receive a notification message sent by a user terminal that is bound to the terminal device, where the notification message is, for example, a SMS message, an e-mail, a WECHAT message, or the like.

A user may further preset the priority attribute of the notification message, and the priority attribute may be classified into a low priority or a high priority. For example, a low-priority notification message may be a calendar, weather, news, or information/an event that is defined by the user and that does not need to be notified, and a high-priority notification message may be information such as a SMS message, an e-mail, or a WECHAT message, or may be information defined by the user and that needs to be notified, for example, flight information, a meeting reminder, or achievement of an exercise target.

The terminal device may first determine the priority attribute of the notification message if the terminal device receives the notification message, to determine whether the user needs to be notified immediately.

Step 305: The terminal device keeps the transmissive LCD in the transparent state if the priority attribute indicates a low priority.

In this embodiment of the present disclosure, the notification message is not a very important message and does not need to be notified to the user immediately if the priority attribute indicates the low priority. In this case, the terminal device may continue to be in the standby state, and keeps the transmissive LCD in the transparent state to display the mechanical structure on the backlight side of the transmissive LCD. The user can still see time displayed by the mechanical structure.

Step 306: The terminal device receives a screen-on instruction entered for the transmissive LCD.

In this embodiment of the present disclosure, when the terminal device is in the standby state, the terminal device may further receive the screen-on instruction entered by the user for the transmissive LCD. The user may operate a panel of the transmissive LCD to trigger entering the screen-on instruction, or the user may operate a mechanical key (such as a power key) on the terminal device to trigger entering the screen-on instruction.

Step 307: The terminal device obtains a moving track of the terminal device within a preset time.

In this embodiment of the present disclosure, to prevent the user from entering the screen-on instruction due to an accidental touch on the terminal device, the terminal device may obtain the moving track of the terminal device within the preset time using a built-in sensor (such as an acceleration sensor or a gyroscope). The preset time may be a period of time before the screen-on instruction is received, for example, 1 second (s), or 3 s.

Step 308: The terminal device determines whether the moving track of the terminal device is consistent with a preset moving track of the terminal device, if yes, performs step 309, if not, ends this procedure.

In this embodiment of the present disclosure, the user may enable the terminal device to learn and record the moving track of the terminal device in advance. For example, assuming that a wrist on which the user wears the terminal device is vertically down, when the user needs to view the terminal device, the user generally raise the wrist to operate the terminal device. In the process in which the user raises the wrist, the terminal device moves as the user raises the wrist, the terminal device may learn and record the moving track of the terminal device in the process in which the user raises the wrist.

Currently, after the terminal device obtains the moving track of the terminal device within the preset time, the terminal device determines whether the moving track of the terminal device is consistent with the prestored moving track of the terminal device. If the moving track of the terminal device is consistent with the prestored moving track of the terminal device, it indicates that entering of the screen-on instruction is really triggered by the user actively rather than the accidental touch, and the terminal device may perform step 309.

Optionally, if the terminal device determines that the moving track of the terminal device is inconsistent with the moving track of the terminal device, it indicates that entering of the screen-on instruction may be triggered by means of the accidental touch of the user, and the terminal device may make no response, and may continue to be in the standby state, and keep the transmissive LCD to be in the transparent state to display the mechanical structure on the backlight side of the transmissive LCD.

Step 309: The terminal device responds to the screen-on instruction, and turns on the transmissive LCD such that the transmissive LCD is in a screen-on state.

In this embodiment of the present disclosure, when the terminal device receives the screen-on instruction entered for the transmissive LCD and determines that currently the moving track of the terminal device is consistent with the prestored moving track of the terminal device, the terminal device may respond to the screen-on instruction, and turn on the transmissive LCD by applying voltage to two electrodes in the transmissive LCD. In this case, the transmissive LCD may be in the screen-on state.

After the user enters the screen-on instruction, the terminal device may turn on the transmissive LCD. In this case, the transmissive LCD is in the screen-on state, and meanwhile, the terminal device may control a polarizer in the transmissive LCD to shield the mechanical structure and display the notification message on the transmissive LCD.

Step 310: The terminal device controls a polarizer in the transmissive LCD to shield the mechanical structure, displays the notification message on the transmissive LCD, and performs step 315.

In this embodiment of the present disclosure, the transmissive LCD presents a high-definition UI and in order to improve a display effect, the terminal device may control the polarizer in the transmissive LCD to shield the mechanical structure, and display the notification message, that is, the low-priority notification message, on the transmissive LCD at the same time.

Figure 3C:
FIG. 3C is a display effect diagram of another terminal device according to an embodiment of the present disclosure.

Referring to FIG. 3C, FIG. 3C is a display effect diagram of another terminal device according to an embodiment of the present disclosure. The terminal device shown in FIG. 3C is in a non-standby state. As can be seen from FIG. 2B, when the terminal device is in the non-standby state, a transmissive LCD is in a screen-on state. In this case, a user can see only a high-definition UI interface displayed on the transmissive LCD, where the high-definition UI interface includes a notification message, and cannot see a mechanical watch face on a backlight side of the transmissive LCD.

Step 311: The terminal device detects a heart rate of a user wearing a wearable device if the priority attribute indicates a high priority.

In this embodiment of the present disclosure, when the priority attribute of the notification message received by the terminal device is the high priority, the user may be currently in two states, a sleeping state and a non-sleeping state. The user does not immediately view the notification message if the user is in the sleeping state, even if the terminal device receives a high-priority notification message. In this case, unnecessary battery power can be wasted if the transmissive LCD is turned on. Therefore, when the terminal device determines that the priority attribute of the notification message is the high priority, the terminal device may detect, using a heart rate sensor, the heart rate of the user wearing the wearable device.

It should be noted that, the terminal device in this embodiment of the present disclosure may be understood as a wearable device, and the user carries the terminal device.

Step 312: The terminal device determines whether the heart rate is less than a preset heart rate threshold, if not, performs step 313, and if yes, ends this procedure.

In this embodiment of the present disclosure, generally, when the user sleeps, the heart rate is between 50 and 70. Therefore, the preset heart rate may be set to 70. When the terminal device detects that the heart rate of the user wearing the wearable device is greater than 70, it may be determined that the user is in the non-sleeping state. The terminal device may turn on the transmissive LCD such that the transmissive LCD is in the screen-on state, and the terminal device may control the polarizer in the transmissive LCD to shield the mechanical structure, and display the notification message on the transmissive LCD such that the user conveniently views the notification message.

In an optional implementation manner, if the terminal device determines that the heart rate is less than the preset heart rate threshold, it may be determined that the user is in the sleeping state. In this case, the terminal device may make no response, and may continue to be in the standby state, and keep the transmissive LCD in the transparent state to display the mechanical structure on the backlight side of the transmissive LCD.

Step 313: The terminal device turns on the transmissive LCD such that the transmissive LCD is in the screen-on state.

Step 314: The terminal device controls the polarizer in the transmissive LCD to shield the mechanical structure, displays the notification message on the transmissive LCD, and performs step 315.

The terminal device may remind, in multiple manners, the user to view the notification message, for example, in any one of or a combination of the following manners, such as a manner of flashing an LED light, a manner of vibration, or a manner of sound, and the terminal device displays the notification message on the transmissive LCD at the same time.

Referring to FIG. 3C, FIG. 3C is a display effect diagram of another terminal device according to an embodiment of the present disclosure. The terminal device shown in FIG. 3C is in a non-standby state. As can be seen from FIG. 2B, when the terminal device is in the non-standby state, a transmissive LCD is in a screen-on state. In this case, a user can see only a high-definition UI interface displayed on the transmissive LCD, where the high-definition UI interface includes a notification message, and cannot see a mechanical watch face on a backlight side of the transmissive LCD.

Step 315: The terminal device detects whether screen-on duration of the transmissive LCD without operation reaches a preset time threshold, if yes, performs step 316, if not, performs step 315 again.

In this embodiment of the present disclosure, the preset time threshold may be set by a system at delivery of the terminal device, or may be set by the user, for example, the preset time threshold may be 10 s. When the terminal device detects that the screen-on duration of the transmissive LCD without operation reaches the preset time threshold, to save battery power of the terminal device, the terminal device may be restored to the standby state, turn off the transmissive LCD, and control the transmissive LCD to be in the transparent state to display the mechanical structure. If the terminal device detects that the screen-on duration of the transmissive LCD without operation does not reach the preset time threshold, the terminal device may continue to detect whether the screen-on duration of the transmissive LCD without operation reaches the preset time threshold.

Step 316: The terminal device turns off the transmissive LCD, and controls the transmissive LCD to be in the transparent state to display the mechanical structure.

In another optional implementation manner, when the terminal device does not receive the notification message, if the terminal device receives the screen-on instruction entered for the transmissive LCD, the terminal device may respond to the screen-on instruction, and turn on the transmissive LCD such that the transmissive LCD is in the screen-on state.

In this optional implementation manner, the user may operate the terminal device at any time. For example, the user presses a power key of the terminal device to trigger entering the screen-on instruction such that the terminal device responds to the screen-on instruction, and turns on the transmissive LCD, and the transmissive LCD is in the screen-on state. After the terminal device turns on the transmissive LCD, the user may freely operate the transmissive LCD, for example by browsing the interface by means of flicking in any direction.

In another optional implementation manner, after step 310, the terminal device may not need to perform step 315, but perform the following steps of receiving a screen-off instruction entered for the transmissive LCD, responding to the screen-off instruction, and turning off the transmissive LCD, controlling the transmissive LCD to be in the transparent state to display the mechanical structure.

In this optional implementation manner, after the terminal device controls the polarizer in the transmissive LCD to shield the mechanical structure, and displays the low-priority notification message on the transmissive LCD, if the terminal device receives the screen-off instruction entered by the user for the transmissive LCD, the terminal device may immediately respond to the screen-off instruction, turn off the transmissive LCD, and control the transmissive LCD to be in the transparent state to display the mechanical structure. This can save battery power as much as possible, reduce power consumption of the terminal device, and retain a watch function of the terminal device. The user may press a power key of the terminal device to trigger entering the screen-off instruction, or the user may press the transmissive LCD for duration greater than preset duration, to trigger entering the screen-off instruction.

In another optional implementation manner, after step 314, the terminal device may not need to perform step 315, but perform the following steps of receiving a screen-off instruction entered for the transmissive LCD, responding to the screen-off instruction, and turning off the transmissive LCD, controlling the transmissive LCD to be in the transparent state to display the mechanical structure.

In this optional implementation manner, after the terminal device controls the polarizer in the transmissive LCD to shield the mechanical structure, and displays a high-priority notification message on the transmissive LCD, if the terminal device receives the screen-off instruction entered by the user for the transmissive LCD, the terminal device may immediately respond to the screen-off instruction, turn off the transmissive LCD, and control the transmissive LCD to be in the transparent state to display the mechanical structure. This can save battery power as much as possible, reduce power consumption of the terminal device, and retain a watch function of the terminal device.

In the process of the method described FIG. 3A and FIG. 3B, when receiving a notification message, a terminal device may determine, according to a priority attribute of the notification message, a screen-on instruction entered for a transmissive LCD, a moving track of the terminal device, and a heart rate of a user, whether to turn on the transmissive LCD such that the transmissive LCD is in a screen-on state. This can minimize a probability of turning on the transmissive LCD and reduce the power consumption of the terminal device as much as possible in order to extend the service life of the terminal device and retain the watch function of displaying time by the terminal device.

Figure 4:
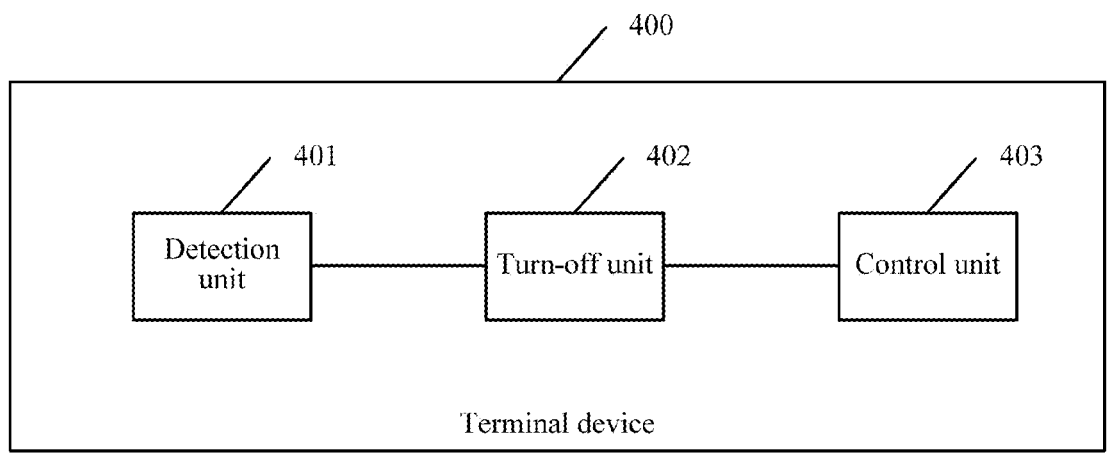
FIG. 4 is a block diagram of simplified functional units of a terminal device according to an embodiment of the present disclosure.

Referring to FIG. 4, FIG. 4 is a block diagram of simplified functional units of a terminal device 400 according to an embodiment of the present disclosure. A terminal device 400 may be configured to perform all or a part of steps of the display control method disclosed in FIG. 2A or FIG. 3A and FIG. 3B. As shown in FIG. 4, the terminal device 400 may include a detection unit 401 configured to detect an operating status of the terminal device 400, a turn-off unit 402 configured to turn off a transmissive LCD of the terminal device 400 if the terminal device 400 is in a standby state, and a control unit 403 configured to control the transmissive LCD to be in a transparent state to display a mechanical structure on a backlight side of the transmissive LCD.

Figure 5:
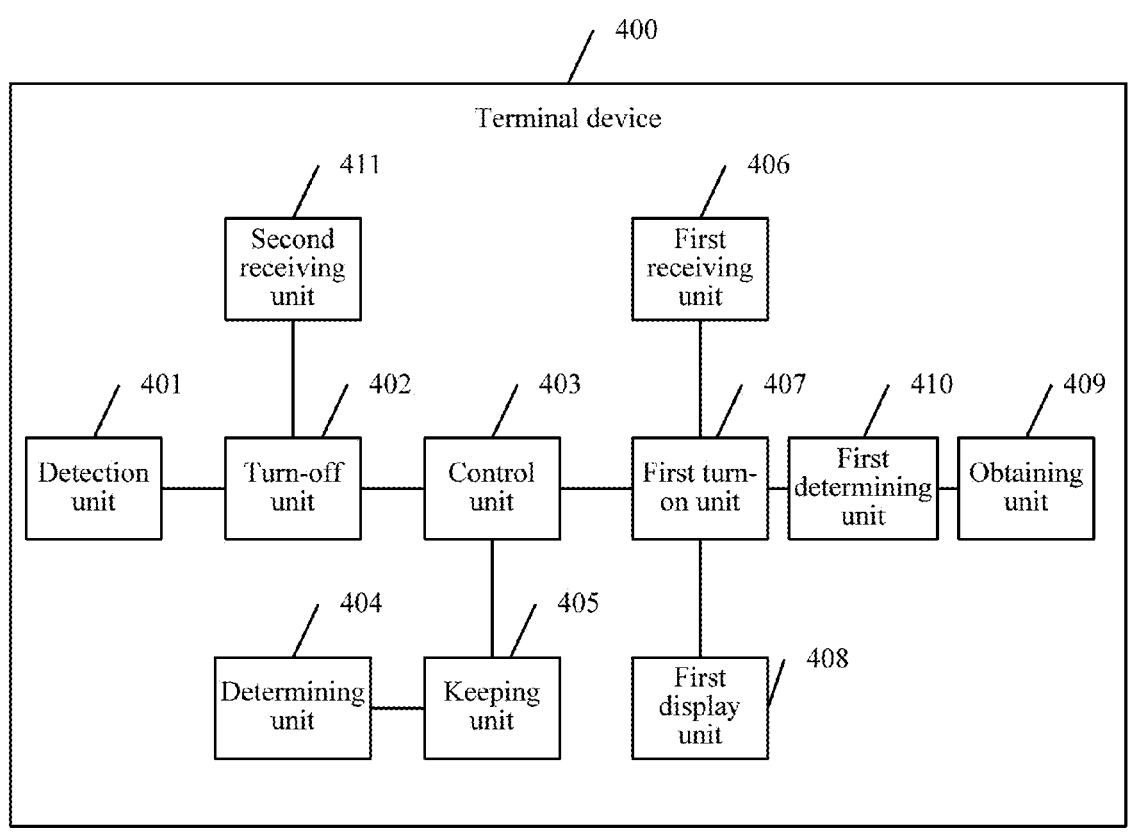
FIG. 5 is a block diagram of simplified functional units of another terminal device according to an embodiment of the present disclosure.

Referring to FIG. 5, FIG. 5 is a block diagram of simplified functional units of another terminal device 400 according to an embodiment of the present disclosure. The terminal device 400 shown in FIG. 5 is obtained after the terminal device 400 shown in FIG. 4 is further optimized. Compared with the terminal device 400 shown in FIG. 4, in addition to all units of the terminal device 400 shown in FIG. 4, the terminal device 400 shown in FIG. 5 may further include a determining unit 404 configured to determine a priority attribute of a notification message if the notification message is received, and a keeping unit 405 configured to keep the transmissive LCD in the transparent state if the priority attribute indicates a low priority.

Optionally, the terminal device 400 shown in FIG. 5 may further include a first receiving unit 406 configured to receive a screen-on instruction entered for the transmissive LCD, a first turn-on unit 407 configured to respond to the screen-on instruction and turn on the transmissive LCD such that the transmissive LCD is in a screen-on state, where the control unit 403 is further configured to control a polarizer in the transmissive LCD to shield the mechanical structure, and a first display unit 408 configured to display the notification message on the transmissive LCD.

Optionally, the terminal device 400 shown in FIG. 5 may further include an obtaining unit 409 configured to obtain a moving track of the terminal device 400 within a preset time after the first receiving unit 406 receives the screen-on instruction entered for the transmissive LCD, and a first determining unit 410 configured to determine whether the moving track of the terminal device 400 is consistent with a prestored moving track of the terminal device 400, where the first turn-on unit 407 is further configured to respond to the screen-on instruction and turn on the transmissive LCD such that the transmissive LCD is in the screen-on state when the first determining unit 410 determines that the moving track of the terminal device 400 is consistent with the prestored moving track of the terminal device 400.

Optionally, the detection unit 401 is further configured to detect whether screen-on duration of the transmissive LCD without operation reaches a preset time threshold. The turn-off unit 402 is further configured to turn off the transmissive LCD if the detection unit 401 detects that the screen-on duration of the transmissive LCD without operation reaches the preset time threshold, and the control unit 403 is further configured to control the transmissive LCD to be in the transparent state to display the mechanical structure.

Optionally, the terminal device 400 shown in FIG. 5 may further include a second receiving unit 411 configured to receive a screen-off instruction entered for the transmissive LCD, where the turn-off unit 402 is further configured to turn off the transmissive LCD, and the control unit 403 is further configured to control the transmissive LCD to be in the transparent state to display the mechanical structure.

Figure 6:
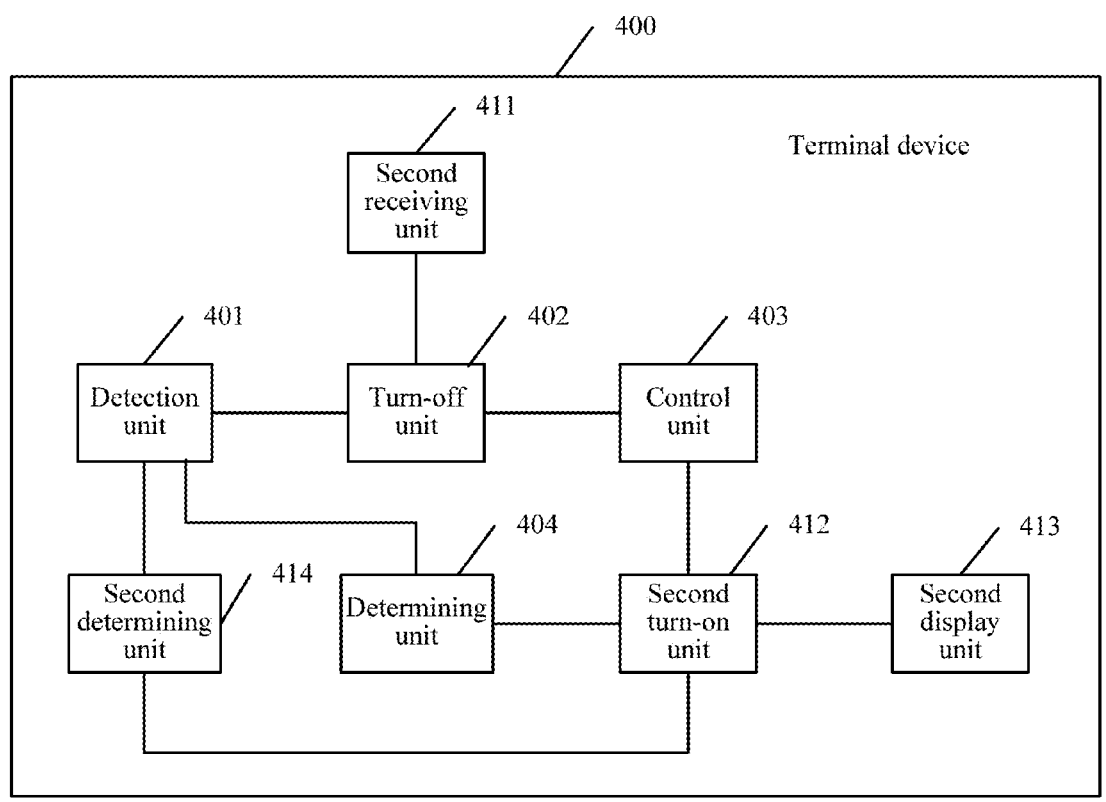
FIG. 6 is a block diagram of simplified functional units of another terminal device according to an embodiment of the present disclosure.

Referring to FIG. 6, FIG. 6 is a block diagram of simplified functional units of another terminal device 400 according to an embodiment of the present disclosure. The terminal device 400 shown in FIG. 6 is obtained after the terminal device 400 shown in FIG. 4 is further optimized. Compared with the terminal device 400 shown in FIG. 4, in addition to all units of the terminal device 400 shown in FIG. 4, the terminal device 400 shown in FIG. 6 may further include a determining unit 404 configured to determine a priority attribute of a notification message if the notification message is received, a second turn-on unit 412 configured to turn on the transmissive LCD such that the transmissive LCD is in the screen-on state if the priority attribute indicates a high priority, where the control unit 403 is further configured to control a polarizer in the transmissive LCD to shield the mechanical structure, and a second display unit 413 configured to display the notification message on the transmissive LCD.

The terminal device 400 shown in FIG. 6 may be a wearable device. The detection unit 401 is further configured to detect a heart rate of a user wearing the wearable device after the determining unit 404 determines that the priority attribute of the notification message is the high priority. The terminal device 400 shown in FIG. 6 further includes a second determining unit 414 configured to determine whether the heart rate is less than a preset heart rate threshold, and the second turn-on unit 412 is further configured to turn on the transmissive LCD such that the transmissive LCD is in the screen-on state when the second determining unit 414 determines that the heart rate is less than the preset heart rate threshold.

Optionally, the detection unit 401 is further configured to detect whether screen-on duration of the transmissive LCD without operation reaches a preset time threshold. The turn-off unit 402 is further configured to turn off the transmissive LCD if the detection unit 401 detects that the screen-on duration of the transmissive LCD without operation reaches the preset time threshold, and the control unit 403 is further configured to control the transmissive LCD to be in the transparent state to display the mechanical structure.

Optionally, the terminal device 400 shown in FIG. 6 may further include a second receiving unit 411 configured to receive a screen-off instruction entered for the transmissive LCD, where the turn-off unit 402 is further configured to turn off the transmissive LCD, and the control unit 403 is further configured to control the transmissive LCD to be in the transparent state to display the mechanical structure.

In the terminal device 400 described in FIG. 4 to FIG. 6, the terminal device 400 includes a transmissive LCD and a mechanical structure located on a backlight side of the transmissive LCD. The detection unit 401 may detect an operating status of the terminal device 400 in real time. If the terminal device 400 is in a standby state, the turn-off unit 402 may turn off the transmissive LCD of the terminal device 400, and the control unit 403 controls the transmissive LCD to be in a transparent state to display the mechanical structure on the backlight side of the transmissive LCD. As can be seen, by means of this embodiment of the present disclosure, when the terminal device 400 is in the standby state, the transmissive LCD of the terminal device 400 may be directly turned off and the transmissive LCD of the terminal device does not need to be woken up in order to reduce power consumption of the terminal device 400. In addition, even if battery power of the terminal device 400 is thoroughly consumed, the transmissive LCD of the terminal device 400 is in the transparent state such that the mechanical structure on the backlight side of the transmissive LCD can be displayed. In this way, a watch function of displaying time by the terminal device 400 can be retained.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. Secondly, it should be further appreciated by a person skilled in the art that the embodiments described in this specification all belong to preferred embodiments, and the involved actions and units are not necessarily required by the present application.

In the foregoing embodiments, the descriptions of the embodiments have respective focuses. For a part that is not described in detail in an embodiment, reference may be made to related descriptions in other embodiments.

A person of ordinary skill in the art may understand that all or a part of the processes of the methods in the embodiments may be implemented by a computer program instructing relevant hardware. The program may be stored in a computer readable storage media. The processes of the methods in the embodiments are performed when the program runs. The foregoing storage media may be a magnetic disk, an optical disc, a read-only memory (ROM), a random access memory (RAM), or the like.

What is disclosed above is merely examples of embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A display control method, applied to a terminal device comprising a transmissive liquid crystal display (LCD), a backlight side of the transmissive LCD having a mechanical structure, and the method comprising:
   detecting an operating status of the terminal device;
   turning off the transmissive LCD of the terminal device when the terminal device is in a standby state;
   controlling the transmissive LCD to be in a transparent state to display the mechanical structure on the backlight side of the transmissive LCD when the transmissive LCD is turned off;
   receiving a notification message that comprises a priority attribute, the priority attribute indicating whether the notification message has a low priority or a high priority; and
   keeping the transmissive LCD turned off and not providing any indication that the notification message was received when the notification message has the low priority.

2. The method of claim 1, wherein the notification message is determined to have the low priority or the high priority according to the priority attribute of the notification message, a screen-on instruction entered for the transmissive LCD, a moving track of the terminal device, and a heart rate of the user.

3. The method of claim 1, wherein the notification message having the low priority corresponds to the notification message being a calendar, weather, news, or user defined event, and the notification message having the high priority corresponds to the notification message being a short message service message, an e-mail, or another user defined event.

4. The method of claim 1, further comprising:
receiving an input from a user that defines which types of messages have the low priority and which types of messages have the high priority; and
determining that the notification messages has the low priority based on the input from the user.

5. The method of claim 4, further comprising:
receiving a screen-on instruction entered for the transmissive LCD;
responding to the screen-on instruction and turning on the transmissive LCD such that the transmissive LCD is in a screen-on state;
controlling a polarizer in the transmissive LCD to shield the mechanical structure; and
displaying the notification message on the transmissive LCD.

6. The method of claim 5, wherein after receiving the screen-on instruction entered for the transmissive LCD, the method further comprises:
obtaining a moving track of the terminal device within a preset time;
determining whether the moving track of the terminal device is consistent with a prestored moving track of the terminal device; and
responding to the screen-on instruction and turning on the transmissive LCD such that the transmissive LCD is in the screen-on state when the moving track of the terminal device is consistent with the prestored moving track of the terminal device.

7. The method of claim 5, further comprising:
detecting whether a screen-on duration of the transmissive LCD without operation reaches a preset time threshold;
turning off the transmissive LCD when the screen-on duration of the transmissive LCD without operation reaches the preset time threshold; and
controlling the transmissive LCD to be in the transparent state to display the mechanical structure.

8. The method of claim 5, further comprising:
receiving a screen-off instruction entered for the transmissive LCD;
responding to the screen-off instruction and turning off the transmissive LCD; and
controlling the transmissive LCD to be in the transparent state to display the mechanical structure.

9. The method of claim 4, further comprising:
turning on the transmissive LCD such that the transmissive LCD is in a screen-on state when the priority attribute indicates the high priority;
controlling a polarizer in the transmissive LCD to shield the mechanical structure; and
displaying the notification message on the transmissive LCD.

10. The method of claim 9, wherein the terminal device is a wearable device, and when the priority attribute of the notification message is the high priority, the method further comprises:

detecting a heart rate of the user wearing the wearable device;
determining whether the heart rate is less than a preset heart rate threshold; and
turning on the transmissive LCD such that the transmissive LCD is in the screen-on state when the heart rate is not less than the preset heart rate threshold.

11. A terminal device, comprising:
a memory comprising instructions; and
a processor coupled to the memory, the instructions causing the processor to be configured to:
detect an operating status of the terminal device;
turn off a transmissive liquid crystal display (LCD) of the terminal device when the terminal device is in a standby state;
control the transmissive LCD to be in a transparent state to display a mechanical structure on a backlight side of the transmissive LCD when the transmissive LCD is turned off;
receive a notification message that comprises a priority attribute, the priority attribute indicating whether the notification message has a low priority or a high priority; and
keep the transmissive LCD turned off and not provide any indication that the notification message was received when the notification message has the low priority.

12. The terminal device of claim 11, wherein the notification message is determined to have the low priority or the high priority according to the priority attribute of the notification message, a screen-on instruction entered for the transmissive LCD, a moving track of the terminal device, and a heart rate of the user.

13. The terminal device of claim 11, wherein the notification message having the low priority corresponds to the notification message being a calendar, weather, news, or user defined event, and the notification message having the high priority corresponds to the notification message being a short message service message, an e-mail, or another user defined event.

14. The terminal device of claim 11, wherein the instructions further cause the processor to be configured to:
receive an input from a user that defines which types of messages have the low priority and which types of messages have the high priority; and
determine that the notification messages has the low priority based on the input from the user.

15. The terminal device of claim 14, wherein the terminal device further comprises a receiver coupled to the processor and the memory, the instructions causing the receiver to be configured to receive a screen-on instruction entered for the transmissive LCD, and the instructions further causing the processor to be configured to:
respond to the screen-on instruction and turn on the transmissive LCD such that the transmissive LCD is in a screen-on state;
control a polarizer in the transmissive LCD to shield the mechanical structure; and
display the notification message on the transmissive LCD.

16. The terminal device of claim 15, wherein the instructions further cause the processor to be configured to:
obtain a moving track of the terminal device within a preset time after the receiver receives the screen-on instruction entered for the transmissive LCD;
determine whether the moving track of the terminal device is consistent with a prestored moving track of the terminal device; and respond to the screen-on instruction and turn on the transmissive LCD such that the transmissive LCD is in the screen-on state when the moving track of the terminal device is consistent with the prestored moving track of the terminal device.

17. The terminal device of claim 15, wherein the instructions further cause the processor to be configured to:
   detect whether a screen-on duration of the transmissive LCD without operation reaches a preset time threshold;
   turn off the transmissive LCD when the screen-on duration of the transmissive LCD without operation reaches the preset time threshold; and
   control the transmissive LCD to be in the transparent state to display the mechanical structure.

18. The terminal device of claim 15, wherein the instructions further cause the receiver to be configured to receive a screen-off instruction entered for the transmissive LCD, and the instructions further causing the processor to be configured to:
   turn off the transmissive LCD; and
   control the transmissive LCD to be in the transparent state to display the mechanical structure.

19. The terminal device of claim 14, wherein the instructions further cause the processor to be configured to:
   turn on the transmissive LCD such that the transmissive LCD is in a screen-on state when the priority attribute indicates the high priority;
   control a polarizer in the transmissive LCD to shield the mechanical structure; and
   display the notification message on the transmissive LCD.

20. The terminal device of claim 19, wherein the terminal device is a wearable device, and the instructions further causing the processor to be configured to:
   detect a heart rate of the user wearing the wearable device when the priority attribute of the notification message is the high priority;
   determine whether the heart rate is less than a preset heart rate threshold; and
   turn on the transmissive LCD such that the transmissive LCD is in the screen-on state when the heart rate is not less than the preset heart rate threshold.

* * * * *